United States Patent [19]

Scharpenberg et al.

[11] Patent Number: 4,847,037
[45] Date of Patent: Jul. 11, 1989

[54] APPARATUS FOR THE INSPECTION OF NUCLEAR REACTOR FUEL RODS

[75] Inventors: Rainer Scharpenberg, Wald-Michelbach; Hermann-Josef Heckhausen, Weinheim, both of Fed. Rep. of Germany

[73] Assignee: Brown, Boveri Reaktor GmbH, Mannheim, Fed. Rep. of Germany

[21] Appl. No.: 99,150

[22] Filed: Sep. 18, 1987

[30] Foreign Application Priority Data

Sep. 20, 1986 [DE] Fed. Rep. of Germany ....... 3632060

[51] Int. Cl.⁴ .............................................. G21C 17/06
[52] U.S. Cl. .................................... 376/245; 376/252; 376/258; 73/634
[58] Field of Search ............... 376/252, 258, 245, 260; 73/634, 641

[56] References Cited

U.S. PATENT DOCUMENTS

| | | | |
|---|---|---|---|
| 4,193,843 | 3/1980 | Womack et al. | 376/252 |
| 4,443,402 | 4/1984 | Marini et al. | 376/252 |
| 4,517,152 | 5/1985 | Pieper et al. | 376/252 |
| 4,605,531 | 8/1986 | Leseur et al. | 376/252 |
| 4,637,912 | 1/1987 | Scharpenberg et al. | 376/245 |
| 4,655,993 | 4/1987 | Scharpenberg | 376/252 |
| 4,683,104 | 7/1987 | Scharpenberg | 376/245 |
| 4,689,193 | 8/1987 | Van Swan et al. | 376/252 |
| 4,728,483 | 3/1988 | Ahmed et al. | 376/258 |

FOREIGN PATENT DOCUMENTS

| | | | |
|---|---|---|---|
| 0063681 | 11/1982 | European Pat. Off. | 376/252 |
| 0164510 | 12/1985 | European Pat. Off. | |
| 0164152 | 7/1986 | Japan | 376/245 |

Primary Examiner—Stephen C. Bentley
Assistant Examiner—Daniel Wasil
Attorney, Agent, or Firm—Herbert L. Lerner; Laurence A. Greenberg

[57] ABSTRACT

An apparatus for the inspection of nuclear reactor fuel rods combined in fuel rod clusters with spaces therebetween in a fuel assembly includes test probes each being disposed at a different respective level along the fuel assembly. Fingers are each part of a respective one of the test probes. Ultrasonic test heads are each disposed on a respective one of the fingers. The test heads are inserted into the spaces between the fuel rods, and the insertion position of each of the test probes is corrected independently of the insertion position of the others of the test probes, before insertion of the test probes.

10 Claims, 5 Drawing Sheets

Fig. 6d   Fig. 6e   Fig. 6f
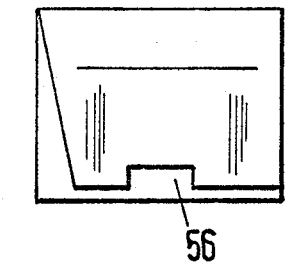
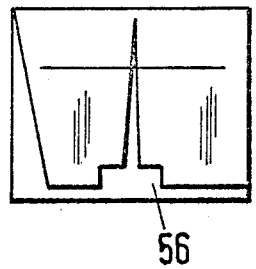
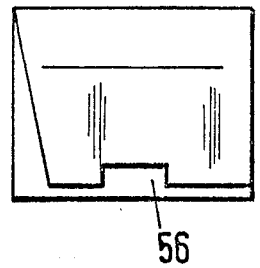
Fig. 6a   Fig. 6b   Fig. 6c
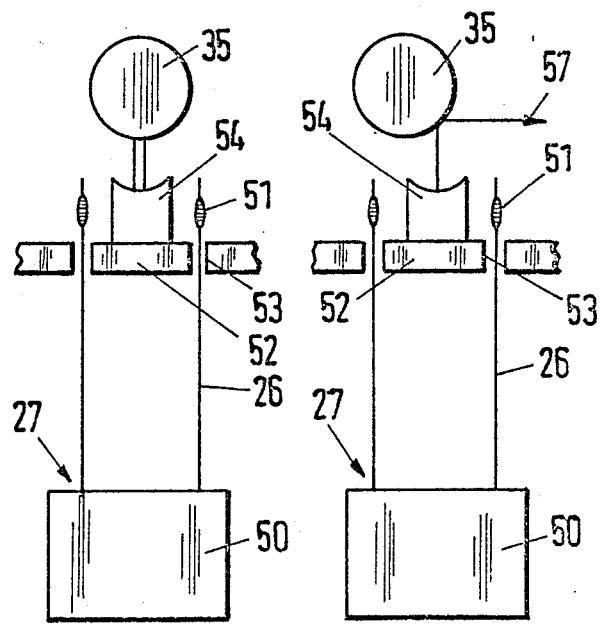

APPARATUS FOR THE INSPECTION OF NUCLEAR REACTOR FUEL RODS

This invention relates to an apparatus for the inspection of nuclear reactor fuel rods, which are combined into fuel rod clusters in a fuel assembly, wherein fingers of a test probe which are fitted with ultrasonic test heads on several levels are insertable into spaces between the fuel rods.

Such an apparatus is known from German Published, Non-Prosecuted Application 34 19 765 corresponding to U.S. Pat. No. 4,683,104. In that device, the probe can be moved parallel to the longitudinal direction of the fuel assembly to permit inspection on several levels. The vertical movement of the probe over several meters (a fuel assembly is approximately 4 meters long) requires a precise and consequently elaborate, spindle drive mechanism. For reasons of radiation protection, the fuel assembly as well as the apparatus are disposed in a water-filled pool. The vertical travel of the probe to the various test levels must therefore take place slowly. The test operation which is executed successively at the various levels, especially the required vertical movement of the probe, contributes to a considerable expenditure of time. Since the inspection of the fuel rods takes place with the reactor plant shut down, the inspection time is lost from the time that the nuclear power plant is available.

It is accordingly an object of the invention to provide an apparatus for the inspection of nuclear reactor fuel rods, which overcomes the hereinafore-mentioned disadvantages of the heretofore-known devices of this general type and which reduces the inspection effort, while nevertheless ensuring a precise positioning of the probe in the direction of the spaces to be passed through.

With the foregoing and other objects in view there is provided, in accordance with the invention, an apparatus for the inspection of nuclear reactor fuel rods combined in fuel rod clusters with spaces therebetween in a fuel assembly, comprising test probes each being disposed at a respective level along the fuel assembly, fingers each being part of a respective one of the test probes, ultrasonic test heads each being disposed on a respective one of the fingers, means for inserting the test heads into the spaces between the fuel rods, and means for correcting the insertion position of each of the test probes independently of the insertion position of the others of the test probes, before insertion of the test probes.

This apparatus ensures that it will be possible to cope with an inclined position of the fuel assembly or a bowing or bending of the fuel rods (a deviation from normal) without any problems, ie. without the risk of a test probe running into a fuel rod. It is only the separate positioning that allows simultaneous testing on several levels.

In accordance with another feature of the invention, there is provided a rack holding the probes assigned to the levels, the inserting means moving the rack together with the probes in a given insertion direction of the probes, and a common drive moving the probes at all of the levels transverse to the given insertion direction. This simply constructed rack, which does not take up any more space than the conventional apparatus with vertically movable probes, allows the joint movement of the probe to be carried out both in the insertion direction and transversely thereto.

In accordance with a further feature of the invention, the rack has a lower surface, and there is provided a support plate having brackets, at least two mutually parallel spindle nuts fixed on the lower surface of the rack, and spindles mounted in the brackets and engaging in the spindle nuts for moving the rack and the support plate. This structure provides for integration of the sequence of movement and for the support of the rack.

In accordance with an added feature of the invention, the rack has bearing points at each of the levels, shafts disposed at the bearing points at each of the levels, the shafts each having a central region in the form of a spindle, probe carriers in the form of spindle nuts each being disposed on a respective one of the central regions, and pairs of bars each bordering a respective one of the central regions and being fixed relative to respective one of the shafts, the bars jutting out from the shafts in the same direction as the fingers of the probe by a distance at least equal to the diameter of a fuel rod, the bars of the pairs being spaced apart by a distance equal to the nominal width of a fuel assembly, and the shafts being displaceable relative to the bearing points.

In this case, simple mechanical side successfully perform the automatic guidance of the probes in the case of fuel assemblies which deviate from normal regarding the vertical disposition thereof.

In accordance with an additional feature of the invention, the rack has opposite side walls at which the bearing points are disposed, the shafts pass through the bearing points and the side walls and have free ends protruding from the side walls, and including abutments disposed on the free ends of the shafts, and compression springs each being disposed between one of the abutments and a respective one of the side walls. This is done in order to ensure that once they have assumed their position, the bars do not adjust themselves of their own accord.

In accordance with yet another feature of the invention, there are provided worm wheels each being disposed on a respective one of the shafts, tongue and groove connections securing the worm wheels on the shafts, and a worm shaft extending transversely to the shafts and simultaneously engaging all of the worm wheels. Since the position of the probes disposed on the individual levels can be corrected, the uniform movement of all of the probes in their travel from one gap to the next is thus ensured. The tongue and groove connection permits axial movement of the shaft relative to the worm wheel.

In accordance with yet a further feature of the invention, there are provided hubs each being disposed on the rack for limiting axial movement of a respective one of worm wheels. The lateral fixing of the worm wheel prevents the worm wheel from following the axial movement of the shaft.

In accordance with yet an added feature of the invention, there is provided a base plate for holding a fuel assembly, two struts jutting out from the base plate parallel to each other and to the fuel assembly, spindle drive mechanisms each being disposed transverse to the struts at a respective one of the levels, spindle nuts each being disposed on a respective one of the spindle drive mechanisms, probe carriers each being disposed on a respective one of the spindle nuts, and drive elements each being disposed on a respective one of the probe carriers for inserting the probes into the spaces between the fuel rods.

Through the use of this structure, the probes of the various levels can be positioned independently of one another and can also execute the insertion movement independently of one another.

In order to effect positioning of the probes, in accordance with yet an additional feature of the invention, there is provided a strip guiding the probe fingers, and an ultrasonic transducer disposed on the strip between the probe fingers, the ultrasonic transducer emitting sound waves in a given insertion direction of the probes and receiving returning echoes providing positional determination of the probes relative to a fuel rod. In this way, the transducer which is constructed as transmitter and receiver receives a maximum echo when the center of the probe coincides with the center of the ultrasonically exposed fuel rod. The insertion movement of the respective probe can then take place immediately.

In accordance with a concomitant feature of the invention, there are provided other struts offset by 90° with respect to the first-mentioned struts, and other probes disposed on the other struts at levels different from the first-mentioned levels. This makes possible the simultaneous testing of a fuel assembly from two sides.

Other features which are considered as characteristic for the invention are set forth in the appended claims.

Although the invention is illustrated and described herein as embodied in an apparatus for the inspection of nuclear reactor fuel rods, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

FIG. 6a to 6c are enlarged, fragmentary, top-plan views of a probe in different locations; and FIGS. 6d to 6f are views of ultrasonic recordings corresponding to FIGS. 6a to 6c.

Figure 1:
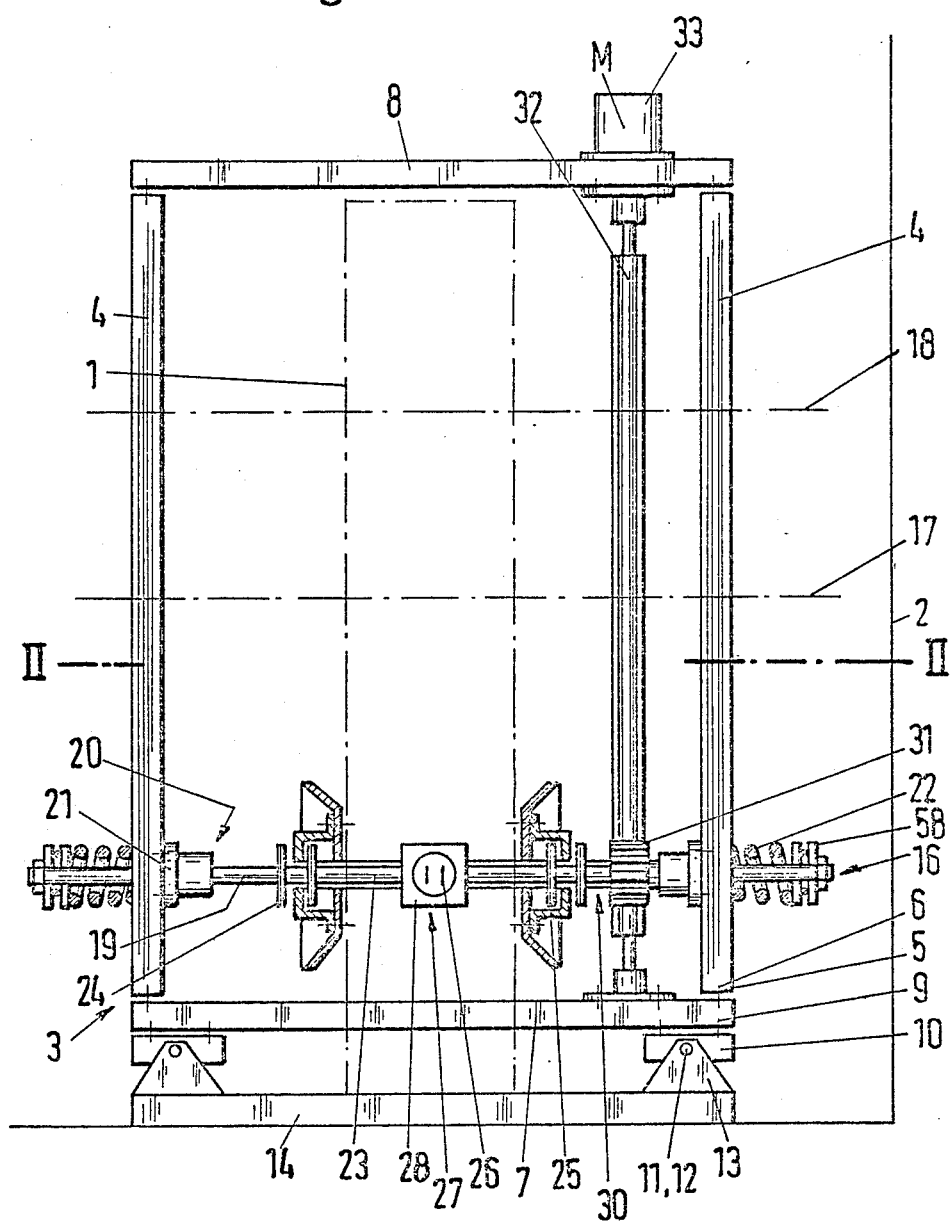
FIG. 1 is a diagrammatic, front-elevational view of an apparatus for the inspection of fuel assemblies.
Figure 2:
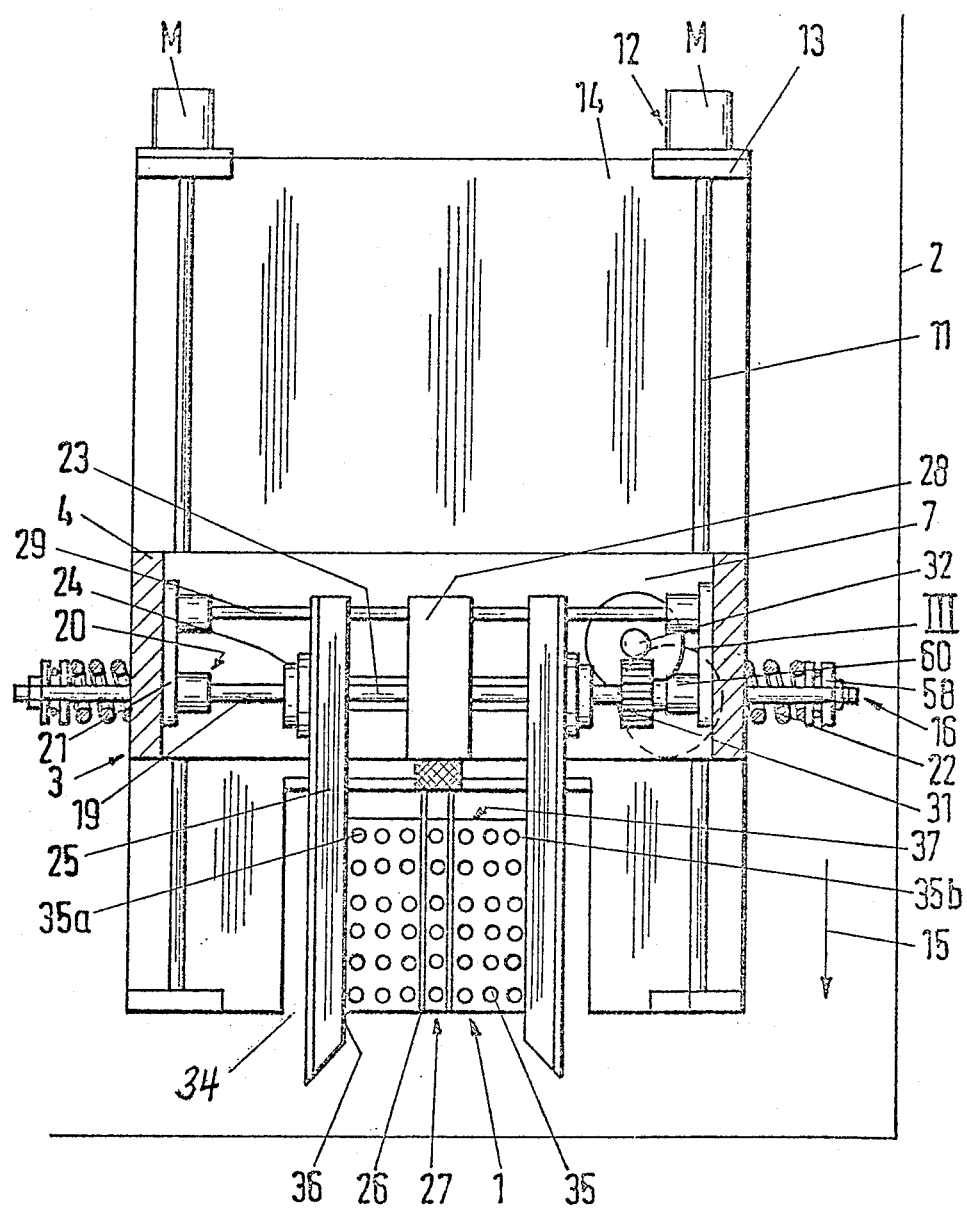
FIG. 2 is a cross-sectional view taken along the line II—II of FIG. 1.

Referring now to the figures of the drawings in detail and first, particularly, to FIGS. 1 and 2 thereof, there is seen an inspection apparatus disposed in a water-filled pool 2 together with a fuel assembly 1 to be tested. The inspection apparatus has a rack 3 which is formed of parallel-extending, oppositely-disposed side walls 4 having ends 5 fixed to a base plate 7 and a cover plate 8 by means of connecting elements 6. Two spindle nuts 10 are coupled to the lower surface of the base plate 7 by screws 9. Parallel-extending spindles 11 are guided in the spindle nuts 10 by two spindle drive mechanisms 12 which are mounted in brackets 13. The brackets 13 are welded to a support plate 14, which is supported on the floor of the pool 2. The spindle drive mechanisms 12 thus advantageously serve both for the movement of the rack 3 in the direction of arrow 15 and for the support thereof.

At each of three levels 16, 17 and 18 shown in FIG. 1, a shaft 19 passes through the opposite side walls 4 of the rack 3. The respective shafts 19 have opposite bearing points 20 which are formed by bearing brackets 21 that are bolted to the side walls. The free ends of the shaft 19 pass through both the respective bearing point 20 and the respective side wall 4. Each of the free shaft ends carries an abutment 58. Compression springs 22 which are disposed between the abutments 58 and the outwardly directed surfaces of the side walls 4, allow a movement of the shaft 19 in the axial direction thereof, within a predetermined amount of play.

A central part 23 of the shaft 19 which is constructed in the form of a threaded spindle, is bounded by disks 24 fixed on the shaft 19. Each disk 24 carries a bar 25, which juts out from the shaft 19 in the same direction as fingers 26 of a probe 27. A spindle nut which engages the thread of the central part 23 is constructed in the form of a probe carrier 28 and thus allows movement of the probes in axial direction of the shaft 19 as soon as the shaft is set in rotation. A rod 29 which is parallel to the shaft 19 and is mounted in the bearing bracket 21, is disposed at the same level as the shaft 19, as shown in FIG. 2. The rod 29 is in the form of a sliding bearing connection which passes through the sides of the bars 25 and the side of the probe carrier 28 facing away from the fuel assembly. The rod 29 thus serves both for arresting the bars and the probe carrier and for guiding these components in the movement thereof in the axial direction of the shaft 19.

For reasons of better clarity, in FIG. 1 the shaft 19 with the components associated therewith is only known in detail for the level 16. The shaft has a similar structure for the levels 17 and 18 and therefore is only indicated at those locations by a phantom line.

Figure 3:
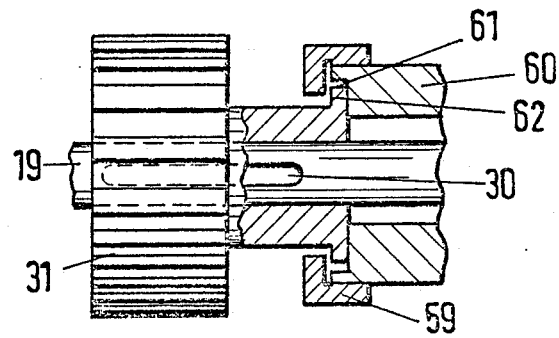
FIG. 3 is fragmentary, partly broken-away view of the portion III of FIG. 2.

As shown in FIG. 3, each shaft 19 is associated with a worm wheel 31 through a tongue and groove connection 30. A cap nut 59 clasps a hub 60 of the bearing point 20 in such a way that an annular gap 61 is formed, which receives a collar 62 of the body of the worm wheel with a predeterminable amount of play. In this way it is ensured that the worm wheel is limited in its axial movement. On the other hand, the worm wheel is not hindered in its rotational movement by the hub 60. The tongue and groove connection 30 is constructed with adequate play to permit an axial movement of the shaft 19 relative to the worm wheel when the worm wheel 31 is stationary. A worm shaft 32 which engages each worm wheel 31, extends between the base plate 7 and the cover plate 8 and is supported at bearing points fixed at those locations. The worm shaft 32 is set in rotation by a drive 33 and allows the simultaneous adjustment of the probe carriers disposed on the various levels 16, 17, 18, in axial direction of the shaft 19.

The function of the inspection devices shown in FIGS. 1 to 3 is explained below.

The fuel assembly 1 to be tested is fixed in the pool or pit 2 or it may be fixed directly on the base plate 14 in a non-illustrated manner. The fuel assembly 1 is disposed in the vicinity of a recess 34 in the base plate 14, so that the relative position of the rack 3 and the fuel assembly 1 can be predetermined. In order to speed up the test procedure, in the illustrated embodiment probes 27 are disposed at three stationary levels 16, 17 and 18, so that the fingers 26 of the probes which are fitted with ultrasonic test heads, are inserted into the spaces between fuel rods 35 of the fuel assembly 1, in order to detect defective fuel rods. The rack 3 is driven by the spindle drive mechanisms 12 so as to move in the insertion direction of the probes (the direction of the arrow 15) towards the fuel assembly, until end regions 36 of the bars 25 contact the outer fuel rods 35a and 35b of the first fuel rod row 37 facing the shaft 19. Since the end regions 36 jut out from the shaft 19 further than the free ends of the fingers 26, at least by an amount which is the same as a fuel rod diameter, the probe 27 at each level 16, 17, 18 is positioned according to the fuel assembly configurations to be encountered at that level. Due to the compression springs 22 engaging the free ends of the shafts 19, each shaft 19 can compensate for the deviation of the bars from what is normal for the fuel assembly. The shaft 19 thus follows the displacement of the bars caused by bowing or bending of a fuel rod (in such a case the fuel rods generally deviate from the normal in the same direction), due to the solid connection between disk 24 and the shaft 19. Since the inner surfaces of the bars represent the reference point for the probes, after a previous adjustment of the probe carrier 27 by the worm wheel 31, the fingers of the probes 27 can be inserted precisely into the spaces between the fuel rods. The correction with the bars ensures that there is compensation for fuel rod bends with deviations between the individual levels of an order of magnitude of a few millimeters, while preventing a finger 26 from running up against a fuel rod.

Figure 5:
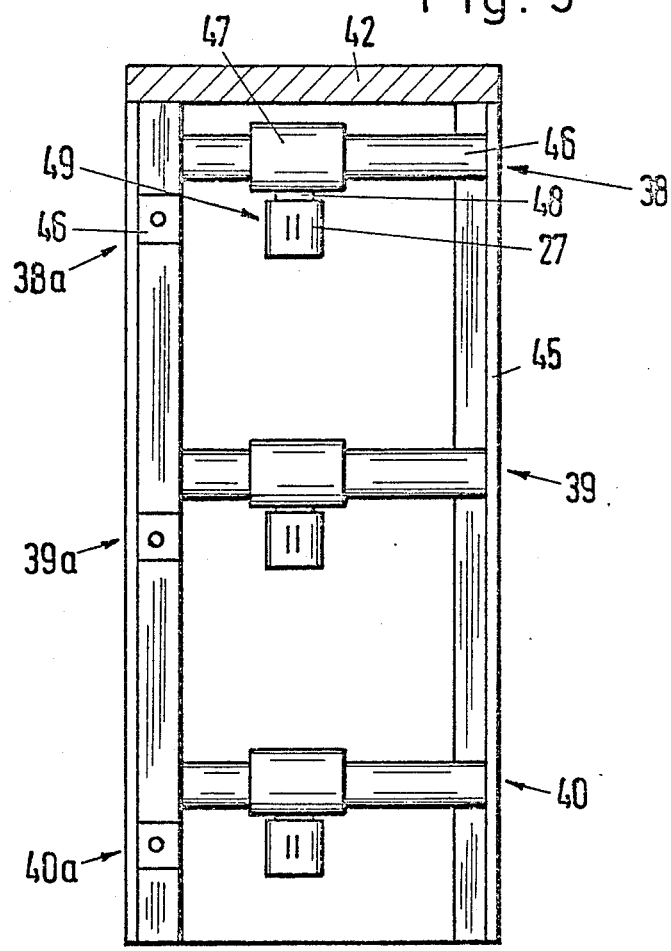
FIG. 5 is a cross-sectional view taken along the line V—V of FIG. 4.
Figure 4:
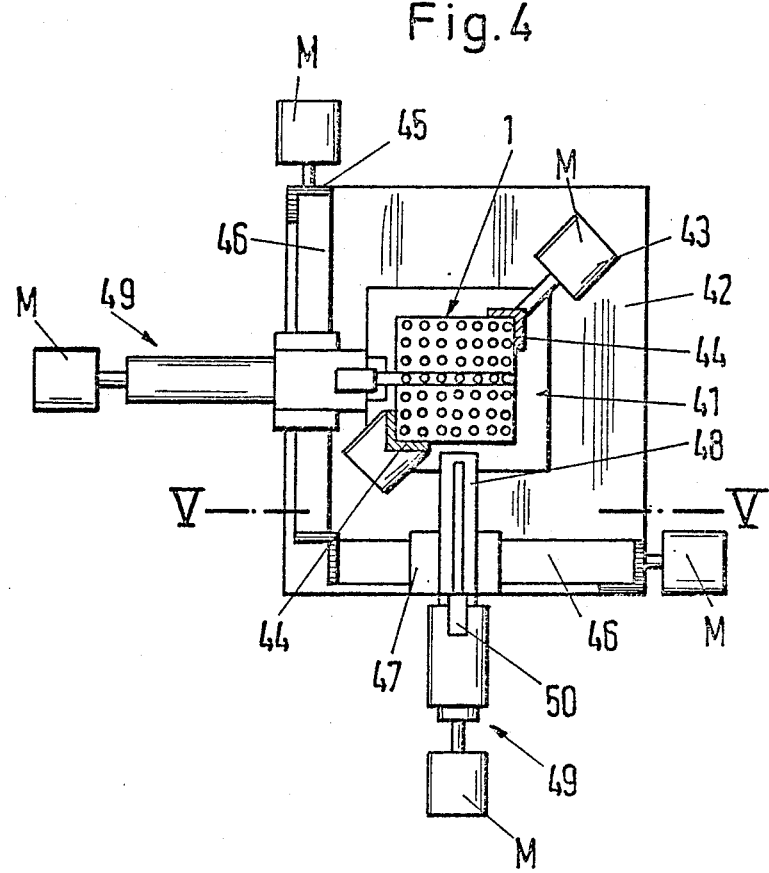
FIG. 4 is a top-plan view of another embodiment of the apparatus.

Another embodiment of the apparatus is represented in FIGS. 4 and 5. As FIG. 5 shows, the probes 27 are also disposed on various levels 38, 39, 40. A fuel assembly 1 to be tested is supported in a recess 41 in a base plate 42 and held by two clamping jaws 44, which can be controlled by means of a drive 43. Three struts 45 extend in vertical direction in front of the base plate 42. Spindle drive mechanisms 46 extend between the struts on various levels, so that several probes 27 which are mutually offset by 90°, can be inserted in the spaces between the fuel rods 35. For this purpose, it is necessary for the levels 38a, 39a, 40a of the probes which are offset by 90° to be at a different height than the levels 38, 39, 40 in order to permit a simultaneous insertion from various fuel assembly sides. Each spindle drive mechanism 46 disposed between the struts has a probe carrier 48 fixed on a spindle nut 47, which has a drive element 49 for the insertion of the probes into the spaces between the fuel rods.

The adjustment for positionally accurate insertion of the probes in the embodiment of FIGS. 4 and 5 is demonstrated in FIGS. 6a to 6f. FIGS. 6a to 6f show a holder 50 for the fingers 26 which have ultrasonic test heads 51 at the free ends thereof. A strip 52 has slots 53 formed therein for guidance of the fingers 26 and carries an ultrasonic transducer 54 in symmetrical disposition between the fingers. The ultrasonic transducer 54 is equipped for the transmission of sound waves and for the reception of the returned echoes. In order to position the probes, each spindle drive mechanism assigned to a level travels transverse to the insertion direction of the probes. FIGS. 6a to 6f show three results of the sound waves constantly transmitted by the ultrasonic transducer 54 during this process. According to FIG. 6a, the sound wave (symbolized by an arrow 55) runs past the fuel rod. The ultrasonic recording according to FIG. 6d does not provide any reflection and a notch 56 representing a gate circuit remains blank. The strongest echo appears in accordance with FIG. 6b, since the center of the probe coincides with the center of the fuel rod 35. According to FIG. 6b, the gate circuit confirms the correct position of the echo. In this position, the probe can enter the gaps without risk of collision. FIG. 6c shows the deflection of the sound wave symbolized by an arrow 57 in FIG. 6c. The associated ultrasonic recording according to FIG. 6f therefore does not reveal any echo.

The foregoing is a description corresponding to substance to German Application P 36 32 060.9, dated Sept. 20, 1986, the International priority of which is being claimed for the instant application, and which is hereby made part of this application. Any material discrepancies between the foregoing specification and the aforementioned corresponding German application are to be resolved in favor of the latter.

We claim:

1. Apparatus for the inspection of nuclear reactor fuel rods combined in fuel rod clusters with spaces therebetween in a fuel assembly, comprising test probes each being disposed at a different respective level along the fuel assembly, fingers each being part of a respective one of said test probes, ultrasonic test head each being disposed on a respective one of said fingers, means for inserting said test heads into the spaces between the fuel rods, and means for correcting the insertion position of each of said test probes independently of the insertion position of the others of said test probes, before insertion of said test probes.

2. Apparatus according to claim 1, including a rack holding said probes assigned to said levels, said inserting means moving said rack together with said probes in a given insertion direction of said probes, and a common drive moving said probes at all of said levels transverse to said given insertion direction.

3. Apparatus according to claim 2, wherein said rack has a lower surface, and including a support plate having brackets, at least two mutually parallel spindle nuts fixed on said lower surface of said rack, and spindles mounted in said brackets and engaging in said spindle nuts for moving said rack and said support plate.

4. Apparatus according to claim 2, wherein said rack has bearing points at each of said levels, shafts disposed at said bearing points at each of said levels, said shafts each having a central region in the form of a spindle, probe carriers in the form of spindle nuts each being disposed on a respective one of said central regions, and pair of bars each bordering a respective one of said central regions and being fixed relative to a respective one of said shafts, said bars jutting out from said shafts in the same direction as said fingers of said probe by a distance at least equal to the diameter of a fuel rod, said bars of said pairs being spaced apart by a distance equal to the nominal width of a fuel assembly, and said shafts being displaceable relative to said bearing points.

5. Apparatus according to claim 4, wherein said rack has opposite side walls at which said bearing points are disposed, said shafts pass through said bearing points and said side walls and have free ends protruding from said side walls, and including abutments disposed on said free ends of said shafts, and compression springs each being disposed between one of said abutments and a respective one of said side walls.

6. Apparatus according to claim 4, including worm wheels each being disposed on a respective one of said shafts, tongue and groove connections securing said worm wheels on said shafts, and a worm shaft extending transversely to said shafts and simultaneously engaging all of said worm wheels.

7. Apparatus according to claim 6, including hubs each being disposed on said rack for limiting axial movement of a respective one of worm wheels.

8. Apparatus according to claim 1, including a base plate for holding a fuel assembly, two struts jutting out from said base plate parallel to each other and to the fuel assembly, spindle drive mechanisms each being disposed transverse to said struts at a respective one of said levels, spindle nuts each being disposed on a respective one of said spindle drive mechanisms, probe carriers each being disposed on a respective one of said spindle nuts, and drive elements each being disposed on a respective one of said probe carriers for inserting said probes into the spaces between the fuel rods.

9. Apparatus according to claim 8, wherein said correcting means include a strip guiding said probe fingers, and an ultrasonic transducer disposed on said strip between said probe fingers, said ultrasonic transducer emitting sound waves in a given insertion direction of said probes and receiving returning echoes providing positional determination of said probes relative to a fuel rod.

10. Apparatus according to claim 8, including other struts offset by 90° with respect to said first-mentioned struts, and other probes disposed on said other struts at levels different from said first-mentioned levels.

* * * * *